United States Patent Office 3,232,766
Patented Feb. 1, 1966

3,232,766
PRESERVATION OF BEER
Frede B. Strandskov, North Caldwell, and John B. Bockelmann, Tenafly, N.J., assignors to The F. & M. Schaefer Brewing Company, Brooklyn, N.Y.
No Drawing. Filed Feb. 23, 1965, Ser. No. 434,645
12 Claims. (Cl. 99—48)

The present application is a continuation-in-part of copending application Serial No. 130,779, filed August 11, 1961, now U.S. Patent No. 3,175,912.

The present invention relates generally to the control of micro-biological growth in finished packaged beer and ale with a novel preservative composition.

It is a desideratum in the beer-making art to eliminate the necessity for the pasteurization and/or refrigeration of beer. This is due to both the deleterious effects of the pasteurization on the properties of the beer, as for example on the taste, as well as to the realization of savings in cost per unit of production.

Beer may be preserved against microbial growth, and spoilage thus prevented, by addition to the finished beer of the heptyl or octyl ester of para-hydroxybenzoic acid or an alkali metal (e.g. Na, K, etc.) or alkaline earth metal (e.g. Ca, etc.) salt thereof as disclosed in copending application Serial No. 130,779. The discovery of the use of these compounds in preserving beer represents a great advance in the art of beer making and provides a means by which the disadvantages attendant upon the pasteurization and/or refrigeration of the beer are avoided.

The present invention is a further advance in the preservation of beer and, in the first aspect, is based on the discovery that the preservation of beer may be accomplished and that undesirable microbial growth may be prevented by means of the heptyl or octyl ester of para-hydroxybenzoic acid or an alkali metal or alkaline earth metal salt thereof in conjunction with the antibiotic Pimaracin, which is described in British Patent 846,933 of September 7, 1960, or the alkali metal salts of Pimaracin or the alkaline earth metal salts of Pimaracin. Such combination of additives makes it possible to obtain the desirable attributes incident to the chemical preservation of beer as set forth above, while minimizing any undesired effects flowing from the individual use thereof.

In a first aspect thereof, this invention relates to the preservation of beer by incorporating into the beer for intimate admixture therewith a combination of (a) a compound of the formula

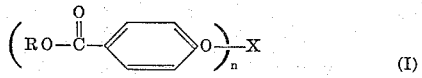
(I)

wherein X represents H, an alkali metal (e.g., sodium, potassium, etc.) or alkaline earth metal (e.g., calcium, etc.); n is an integer equal to the valence of X; R represents octyl or heptyl, e.g., n-octyl or n-heptyl; and (b) the antibiotic Pimaracin or the alkali metal salt thereof (e.g., sodium, potassium, etc.) or the alkaline earth metal salt thereof (e.g., calcium, etc.).

In the second aspect, this invention relates to the preservation of beer by incorporating into the beer for intimate admixture therewith a combination of (a) a compound of the formula

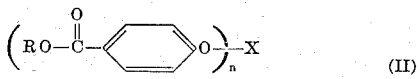
(II)

wherein X represents H, an alkali metal (e.g., sodium, potassium, etc.) or an alkaline earth metal (e.g., calcium, etc.); n is an integer equal to the valence of X; R represents an alkyl group having from 1 to 6 carbon atoms; and (b) the antibiotic Pimaracin or the alkali metal salt thereof (e.g., sodium, potassium, etc.) or the alkaline earth metal salt thereof (e.g., calcium, etc.).

The preservation of the finished beer with Pimaracin alone or with the para-hydroxybenzoic acid ester compound (II) alone is not feasible because, inter alia, the beer will not be preserved for a satisfactory length of time.

It has been found that when utilized in combination with the para-hydroxybenzoic acid ester compound (I) or (II) referred to above, not only is the amount of the Pimaracin necessary for preservation reduced to an acceptable level, but also the amount of the para-hydroxybenzoic acid ester compound is more than correspondingly reduced. That is, the compounds when employed in conjunction with each other display a synergistic action. Thus, the magnitude of preservation obtained with a given amount of the mixture of the aforesaid compounds exceeds the sum of the magnitudes of preservation obtained individually by the component parts of the mixture.

The method of this invention comprises incorporating a mixture of Pimaracin, or its salts as enumerated supra, and the para-hydroxyzenzoic compound (I) or (II) into the beer in an amount sufficient to prevent undesirable microbial growth and thus prevent spoilage of the product, even in long storage prior to consumption. The Pimaracin and para-hydroxybenzoic acid ester compound (I) or (II) can be added to the beer in the proper amounts individually. Alternatively, a stock solution may be prepared containing the proper ratio of the components and the proper amount of this stock solution added to the beer. The latter alternative is more convenient and it is thus preferred.

The additives are incorporated into the beer at any time during the preparation, provided that they will not interfere with a subsequent processing stage in the beer manufacture, and provided that a further processing stage will not interfere with their effectiveness in the beer. It is advantageous to add them to the finished beer. The term "finished" beer in the instant specification refers to beer which contains all the necessary additives to make it a commercially acceptable product and which has been subjected to polish filtration. The components may be added to the beer in any form. It is preferred to add them in the form of a stock solution wherein the components are dissolved in a solvent which itself has no deleterious effect upon the beer. This may be, for example, propylene glycol, ethanol, etc.

The amounts of the components utilized in this invention vary over a range depending upon the type of beer being preserved and upon the magnitude of preservation to be attained. In general, however, the Pimaracin is employed in an amount ranging from about 2 parts by weight per million parts by volume of the finished product (p.p.m.) to about 150 p.p.m. It is preferred that it be used in an amount of from about 5 to about 50 p.p.m. The amount of the para-hydroxybenzoic acid ester compound (I) used will likewise vary depending upon the level of preservation desired and the type of beer employed. It will also vary depending upon the specific compound employed. In general, however, it is used in an amount of from about 2 to about 15 p.p.m. An amount of about 4 to about 12 p.p.m. is preferred. The amount of the para-hydroxybenzoic acid ester compound (II) used will similarly vary depending upon the level of preservation desired, the type of beer employed and the specific compound employed. In general, the amount used is from 6 to about 300 p.p.m. (the greater amount being employed for the lower esters). An amount of from 10 to 200 p.p.m. is preferred.

The generic term "beer," in the instant specification and claims, includes, e.g. bock beer, porter and stout, as well as lager beer. Ale and malt liquor are also intended. Further, the said generic term applies also to concentrated and reconstituted beers. Additionally, it is of no consequence how the beer is packaged, e.g. in cartons, bottles, cans or kegs or tank trucks; the present invention applies in each case.

Throughout the entire disclosure, the relationship between parts by weight and parts by volume is the same as that between grams and milliliters (ml.); parts per million (p.p.m.) are uniformly parts by weight of additament (additive) per million parts by volume of finished product. The beer used is the same throughout the disclosure.

The following examples are illustrative of the invention and are not to be considered exhaustive or limitative thereof.

EXAMPLE I

From the regular production line, fill each of a group of clean 12 ounce (oz.) brown beer bottles with 12 oz. of cold, unpasteurized finished beer into which no chemical additive has ben incorporated. Foam up the beer to expel headspace air, and cap. Each of these bottles contains 350 ml. of unpasteurized lager beer. These bottles are utilized as the control in the examples. Store these bottles at room temperature (about 15 to 30° C.), periodically (weekly) examining them for microbiological spoilage.

Various stock solutions are prepared as hereinafter disclosed for use in the following examples.

*Stock solution No. 1*

Dissolve 420 milligrams (mgms.) of n-heptyl para-hydroxybenzoate in a sufficient amount of propylene glycol to make 100 ml. of solution. The additon of 0.5 ml. of this solution, containing 2.1 mgms. of the n-heptyl para-hydroxybenzoate, to 350 ml. of beer yields a solution of 6 p.p.m. of the benzoate.

*Stock solution No. 2*

Dissolve 3.5 gms. of Pimaracin in a sufficient amount of propylene glycol to make 100 ml. of solution. The addition of 0.5 ml. of this solution, containing 17.5 mgms. of Pimaracin to 350 ml. of beer yields a solution containing 50 p.p.m. of the Pimaracin.

*Stock solution No. 3*

Dissolve 420 mgms. of n-heptyl para-hydroxybenzoate and 700 mgms. of Pimaracin in a sufficient amount of propylene glycol to make 100 ml. of stock solution. The addition of 0.5 ml. of this solution, containing 2.1 mgms. of n-heptyl para-hydroxybenzoate and 3.5 mgms. of Pimaracin to 350 ml. of beer yields a solution containing 6 p.p.m. of the benzoate and 10 p.p.m. of Pimaracin

*Stock solution No. 4*

Dissolve 420 mgms. of n-octyl para-hydroxybenzoate in a sufficient amount of propylene glycol to make 100 ml. of solution. The addition of 0.5 ml. of this solution containing 2.1 mgms. of the n-octyl para-hydroxybenzoate, to 350 ml. of beer yields a solution of 6 p.p.m. of the benzoate.

*Stock solution No. 5*

Dissolve 420 mgms. of n-octyl para-hydroxybenzoate and 700 mgms. of Pimaracin in a sufficient amount of propylene glycol to make 100 ml. of stock solution. The addition of 0.5 ml. of this solution, containing 2.1 mgms. of n-octyl para-hydroxybenzoate and 3.5 mgms. of Pimaracin, to 350 ml. of beer yields a solution containing 6 p.p.m. of the benzoate and 10 p.p.m. of Pimaracin.

*Stock solution No. 6*

Dissolve 700 mgms. of n-hexyl para-hydroxybenzoate in a sufficient amount of propylene glycol to make 100 ml. of solution. The addition of 0.5 ml. of this solution, containing 3.5 m.g.m.s. of the benzoate, to 350 ml. of beer yields a solution of 10 p.p.m. of the benzoate.

*Stock solution No. 7*

Dissolve 700 mgms. of n-hexyl para-hydroxybenzoate and 3.5 gms. of Pimarcin in a sufficient amount of propylene glycol to make 00 ml. of stock solution. The addition of 0.5 ml. of this solution, containing 3.5 mgms. of the benzoate and 17.5 mgms. of Pimaracin, to 350 ml. of beer yields a solution of 10 p.p.m. of the benzoate and 50 p.p.m. of Pimarcin.

*Stock solution No. 8*

Dissolve 1.4 gms. of n-pentyl para-hydroxybenzoate in a sufficient amount of propylene glycol to make 100 ml. of solution. The addition of 0.5 ml. of this solution, containing 7.0 mgms. of the benzoate, to 350 ml. of beer yields a solution of 20 p.p.m. of the benzoate.

*Stock solution No. 9*

Dissolve 1.4 gms. of n-pentyl para-hydroxybenzoate and 3.5 gms. of Pimarcin in a sufficient amount of propylene glycol to make 100 ml. of stock solution. The addition of 0.5 ml. of this solution, containing 7.0 mgms. of the benzoate and 17.5 mgms. of Pimaracin, to 350 ml. of beer yields a solution of 20 p.p.m. of the benzoate and 50 p.p.m. of Pimaracin.

*Stock solution No. 10*

Dissolve 3.5 gms. of n-butyl para-hydroxybenzoate in a sufficient amount of propylene glycol to make 100 ml. of stock solution. The addition of 0.9 ml. of this solution, containing 17.5 mgms. of the benzoate, to 350 ml. of beer yields a solution of 50 p.p.m. of the benzoate.

*Stock solution No. 11*

Dissolve 3.5 gms. of n-butyl para-hydroxybenzoate and 3.5 gms. of Pimaracin in a sufficient amount of propylene glycol to make 100 ml. of stock solution. The addition of 0.5 ml. of this solution, containing 17.5 mgms. of the benzoate and 17.5 mgms. of Pimaracin, to 350 ml. of beer yields a solution of 50 p.p.m. of the benzoate and 50 p.p.m. of Pimaracin.

*Stock solution No. 12*

Dissolve 7 gms. of n-propyl para-hydroxybenzoate in a sufficient amount of propylene glycol to make 100 ml. of stock solution. The addition of 0.5 ml. of this solution, containing 35 mgms. of the benzoate, to 350 ml. of beer yields a solution of 100 p.p.m. of the benzoate.

*Stock solution No. 13*

Dissolve 7 gms. of n-propyl para-hydroxybenzoate and 3.5 gms. of Pimaracin in a sufficient amount of propylene glycol to make 100 ml. of stock solution. The addition of 0.5 ml. of this solution, containing 35 mgms. of the benzoate and 17.5 mgms. of Pimaracin, to 350 ml. of beer yields a solution of 100 p.p.m. of the benzoate and 50 p.p.m. of Pimaracin.

*Stock solution No. 14*

Dillsolve 14 gms. of n-methyl para-hydroxybenzoate in a sufficient amount of propylene glycol to make 100 ml. of stock solution. The addition of 0.5 ml. of this solution, containing 70 mgms. of benzoate, to 350 ml. of beer yields a solution of 200 p.p.m. of the benzoate.

*Stock solution No. 15*

Dissolve 14 gms. of n-methyl para-hydroxybenzoate and 3.5 gms. of Pimaracin in a sufficient amount of propylene glycol to make 100 ml. of stock solution. The addition of 0.5 ml. of this solution, containing 70 mgms. of the benzoate and 17.5 mgms. of Pimaracin, to 350 ml. of beer yields a solution of 200 p.p.m. of the benzoate and 50 p.p.m. of Pimaracin.

EXAMPLE II

Into each of several 12 oz. brown beer bottles place 0.5 ml. of stock solution No. 1. Fill these bottles from the regular production line with cold, unpasteurized beer. Foam up the beer to expel headspace air, and cap. Each of these bottles contains 350 ml. of beer together with the stock solution. Store these bottles at room temperature (about 15 to 30° C.), periodically (weekly) examining them for microbiological spoilage. Such spoilage may be readily observed by a marked amount of sediment in the beer and by the unpleasant taste and odor produced by microbial growth and metabolism.

EXAMPLE III

Into each of several 12 oz. brown beer bottles place 0.5 ml. of stock solution No. 2. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically (weekly) examining them for microbiological spoilage.

EXAMPLE IV

Into each of several 12 oz. brown beer bottles place 0.5 ml. of stock solution No. 3. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically (weekly) examining them for microbiological spoilage.

EXAMPLE V

The same procedure is followed as in the preceding examples with stock solutions 4 through 15.

The following table sets forth the results obtained in the foregoing examples.

TABLE I

| | P.p.m. | Pimaracin, P.p.m. | Microbiologically sound after— | Microbiologically spoiled after— |
|---|---|---|---|---|
| n-Heptyl para-hydroxy-benzoate. | 6 | 0 | 5 weeks | 7 weeks. |
| | 0 | 50 | 3 weeks | 4 weeks. |
| | 6 | 10 | >20 weeks | |
| n-Octyl para-hydroxy-benzoate. | 6 | 0 | 5 weeks | 7 weeks. |
| | 6 | 10 | >20 weeks | |
| n-Hexyl para-hydroxy-benzoate. | 10 | 0 | 6 weeks | 8 weeks. |
| | 10 | 50 | >20 weeks | |
| n-Pentyl para-hydroxy-benzoate. | 20 | 0 | 6 weeks | 8 weeks. |
| | 20 | 50 | >20 weeks | |
| n-Butyl para-hydroxy-benzoate. | 50 | 0 | 8 weeks | 10 weeks. |
| | 50 | 50 | >20 weeks | |
| n-Propyl para-hydroxy-benzoate. | 100 | 0 | 6 weeks | 8 weeks. |
| | 100 | 50 | >20 weeks | |
| n-Methyl para-hydroxy-benzoate. | 200 | 0 | 6 weeks | 8 weeks. |
| | 200 | 50 | >20 weeks | |
| Unpasteurized [1] control | | | 2 weeks | 3 weeks. |
| Pasteurized [2] control | | | >20 weeks | |

[1] The control product is beer prepared as in Example I to which no additive had been introduced.
[2] The pasteurized control is beer prepared as in Example I to which no additive has been introduced and which has been subjected to standard pasteurization treatment.

The results set forth in the table show that the beer preserved with the respective benzoates alone spoils between the fifth and eighth weeks of storage while the beer preserved with the Pimaracin alone spoils between the third and fourth weeks. But the beer to which both the components have been added is not spoiled even after more than twenty weeks at which time the tests were discontinued. This establishes the synergistic action obtained when using the combination of the additives.

In producing beer preserved against microbial growth in accordance with this invention in commercial production quantities, the following procedure is followed:

A stock solution is prepared containing the additives in such amount that 2 gals. of the stock solution equally distributed throughout 100 barrels of beer gives the desired concentration of the additives in the beer. The stock solution is injected into the beer pipeline at the desired stage of production of the beer as the beer flows through the line. The rate of injection into the line is correlated to the flow rate of the beer through the line. This correlation may be achieved through methods known in the art, as for example flow meters. This method insures a thorough admixture of the stock solution with the beer. The beer containing the additive intimately admixed therewith is then filled into bottles, cans or kegs, as desired.

The foregoing are merely exemplary embodiments of the instant invention. Lager beer, bock beer, ale, porter, and stout yield similar results when treated in the same manner. The invention may be effectively applied to beer which is packaged in ways other than those illustrated, e.g. canned beer. In any of the preceding examples the corresponding amounts (as indicated in Table I) of any alkali metal or alkaline earth metal salt are employed with equal preservative efficacy. Examples of these salts are compounds of the following formulae:

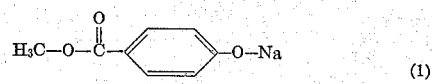
(1)

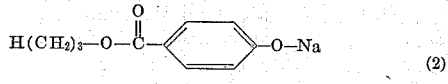
(2)

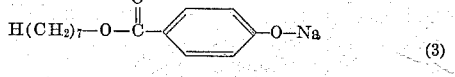
(3)

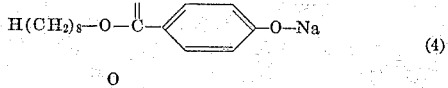
(4)

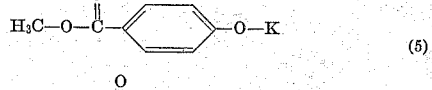
(5)

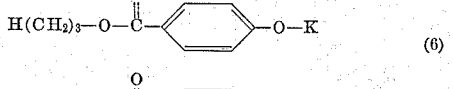
(6)

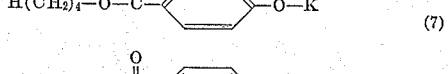
(7)

(8)

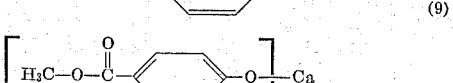
(9)

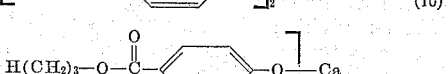
(10)

(11)

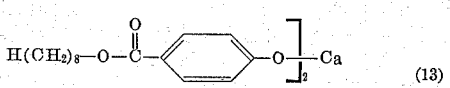
(12)

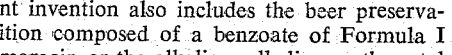
(13)

The present invention also includes the beer preservative composition composed of a benzoate of Formula I or II and Pimaracin or the alkali or alkaline earth metal salts thereof.

Also included within the ambit of the present invention is the addition to beer preserved against microbial spoilage in the manner previously disclosed herein of materials which improve the commercial acceptability of the beer. This includes, but is not limited to, the materials which are added to improve the properties known as chill stability and foam adherence of the beer. In order to be commercially acceptable, a beer must possess certain properties; for example, it must be sparkling clear. Two additional properties which are most significant to beer connoisseurs are referred to as chill stability and foam adherence. The first of these relates to the property noted above as "sparkling clear." As the name implies, on occasion a haze forms in some beer when it is chilled. As the temperature of the beer is returned to room temperature, the haze disappears, only to reappear upon subsequent rechilling. This haze is referred to as chill haze. The second of these significant properties, foam adherence, is of special importance to the connoisseurs. This property relates to the adherence of the beer foam to the sides of the drinking glass as the foam collapses or as the glass is being emptied. Beer, which in all other respects has excellent potential, may be excluded from the market solely because of the lack of an acceptable level of foam adherence. One of the marks of a beer connoisseur is his appreciation of the significance of beer foam adherence to the sides of the drinking glass. These properties may be enhanced by the addition to the beer of a propylene glycol alginate together with another material such as (a) cobalt; (b) a composition known as FS-26W which is a composition composed of 70% by weight zinc sulfate ($ZnSO_4 \cdot H_2O$), 2.5% by weight calcium disodium ethylenediamine tetracetic acid, 2.5% by weight glycine, and 25% by weight gum arabic (powder); or (c) a composition known as Seibex (trade name) or Seibel's A. The amounts of these materials may be varied within ranges which are known in the art. This is also true of the amounts of additional materials which may be added to achieve various desirable attributes in the beer composition. These materials which may be added are limited, of course, to those which do not inter-act with the preserving components to produce adverse effects upon the beer.

Having thus described the invention, what is claimed is:

1. Method for preserving beer which comprises incorporating into finished beer
   (a) from about 2 to 15 parts per million of total composition of a compound of the formula

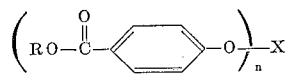

wherein X is a member selected from the group consisting of H, alkali metal, and alkaline earth metal; n is an integer equal to the valence of X; R is a member selected from the group consisting of n-octyl and n-heptyl; and
   (b) from about 2 to 150 parts per million parts of total composition of a member selected from the group consisting of Pimaracin, alkaline earth metal salt of Pimaracin, and alkali metal salt of Pimaracin.

2. Method of preserving beer which comprises incorporating into finished beer
   (a) from about 4 to 12 parts of n-heptyl para-hydroxybenzoate per million parts of total composition, and
   (b) from about 5 to 50 parts of Pimaracin per million parts of total composition.

3. Method of preserving beer which comprises incorporating into finished beer
   (a) from about 4 to 12 parts of the sodium salt of the n-heptyl para-hydroxybenzoate per million parts of total composition, and
   (b) from about 5 to 50 parts of Pimaracin per million parts of total composition.

4. Method of preserving beer which comprises incorporating into finished beer
   (a) from about 4 to 12 parts of the potassium salt of the n-heptyl ester of para-hydroxybenzoic acid per million parts of total composition, and
   (b) from about 5 to 50 parts of Pimaracin per million parts of total composition.

5. The method of preserving beer which comprises incorporating into finished beer
   (a) from about 4 to 12 parts of the calcium salt of the n-heptyl ester of para-hydroxybenzoic acid per million parts of total composition, and
   (b) from about 5 to 50 parts of Pimaracin per million parts of total composition.

6. Finished beer containing
   (a) from about 2 to 15 parts per million of total composition of a compound of the formula

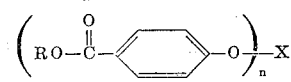

wherein X is a member selected from the group consisting of H, alkali metal, and alkaline earth metal; n is an integer equal to the valence of X; R is a member selected from the group consisting of n-octyl and n-heptyl; and
   (b) from about 2 to 150 parts per million parts of total composition of a member selected from the group consisting of Pimaracin, alkali metal salt of Pimaracin, and alkaline earth metal salt of Pimaracin.

7. Finished beer containing
   (a) from about 4 to 12 parts of n-heptyl para-hydroxybenzoate per million parts of total composition, and
   (b) from about 5 to 50 parts of Pimaracin per million parts of total composition.

8. Finished beer containing
   (a) from about 4 to 12 parts of the sodium salt of n-heptyl para-hydroxybenzoate per million parts of total composition, and
   (b) from about 5 to 50 parts of Pimaracin per million parts of total composition.

9. Finished beer containing
   (a) from about 4 to 12 parts of the potassium salt of n-heptyl para-hydroxybenzoate per million parts of total composition, and
   (b) from about 5 to 50 parts of Pimaracin per million parts of total composition.

10. Finished beer containing
    (a) from about 4 to 12 parts of calcium salt of n-heptyl para-hydroxybenzoate per million parts of total composition, and
    (b) from about 5 to 50 parts of Pimaracin per million parts of total composition.

11. Method for preserving beer which comprises incorporating into finished beer
    (a) from about 6 to 300 parts per million parts of total composition of a compound of the formula

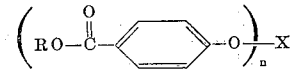

wherein X is a member selected from the group consisting of H, alkali metal, and alkaline earth metal; n is an integer equal to the valence of X; R is straight chain alkyl having from 1 to 6 carbon atoms; and
    (b) from about 2 to 150 parts per million parts of total composition of a member selected from the group consisting of Pimaracin, alkaline earth metal salt of Pimaracin, and alkali metal salt of Pimaracin.

12. Finished beer containing a micro-biological growth inhibiting amount of
    (a) from about 6 to 300 parts per million parts of total composition of a compound of the formula

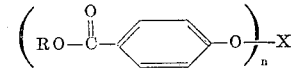

wherein X is a member selected from the group consisting of H, alkali metal, and alkaline earth metal; $n$ is an integer equal to the valence of X; R is straight chain alkyl having from 1 to 6 carbon atoms, and (b) from about 2 to 150 parts per million parts of total composition of a member selected from the group consisting of Pimaracin, alkaline earth metal salt of Pimaracin, and alkali metal salt of Pimaracin.

References Cited by the Examiner

UNITED STATES PATENTS 2,798,811   7/1957   Bockelmann et al. _____ 99—48

OTHER REFERENCES

Antibiotics and Chemotherapy, vol. 7, 1957, pp. 29–36.
Chemical Abstracts, vol. 52, pp. 4874(f)–4875(d), 1958.
Chemical Abstracts, vol. 55, 1961, p. 1684(f), 1961.
Neidig et al.: Drug and Cosmetic Industry, vol. 54, No. 4, Apr. 1, 1944, pp. 408–410, 481–489.
Sabalitschka: Manufacturing Chemist, vol. 2, 1931, pp. 5 to 7.

A. LOUIS MONACELL, *Primary Examiner.*

M. W. GREENSTEIN, *Assistant Examiner.*